United States Patent
Lee et al.

(10) Patent No.: US 6,718,428 B2
(45) Date of Patent: Apr. 6, 2004

(54) STORAGE ARRAY INTERCONNECTION FABRIC USING A TORUS TOPOLOGY

(75) Inventors: Whay S. Lee, Newark, CA (US); Randall D. Rettberg, Danville, CA (US); Nisha D. Talagala, Fremont, CA (US); Chia Y. Wu, Newark, CA (US); Fay Chong, Jr., Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 326 days.

(21) Appl. No.: 09/740,132

(22) Filed: Dec. 18, 2000

(65) Prior Publication Data

US 2003/0221056 A1 Nov. 27, 2003

(51) Int. Cl.[7] .............................................. G06F 12/00
(52) U.S. Cl. ........................ 711/101; 711/154; 711/170; 709/213; 709/217
(58) Field of Search ................................. 709/213, 217; 710/22, 36, 316; 711/101, 111, 112, 114, 147, 148, 151, 154, 170, 173

(56) References Cited

U.S. PATENT DOCUMENTS

| | | | |
|---|---|---|---|
| 5,105,424 A | | 4/1992 | Flaig et al. |
| 5,583,990 A | * | 12/1996 | Birrittella et al. ............. 712/29 |
| 5,612,897 A | | 3/1997 | Rege |

(List continued on next page.)

FOREIGN PATENT DOCUMENTS

| | | |
|---|---|---|
| EP | 439 693 | 8/1991 |
| EP | 550 853 | 12/1992 |
| EP | 646 858 | 8/1994 |
| EP | 669 584 | 2/1995 |
| EP | 0 785 512 | 7/1997 |
| WO | 92/06436 | 4/1992 |
| WO | 94/12939 | 6/1994 |
| WO | 99/17217 | 4/1999 |
| WO | 99/26429 | 5/1999 |
| WO | 99/63442 | 12/1999 |
| WO | 02/50682 | 6/2002 |
| WO | 02/50683 | 6/2002 |

OTHER PUBLICATIONS

International Search Report for PCT/US 01/47893, mailed Jul. 16, 2002.
Bradley Kuszmaul, Mercury Computer Systems, Inc., "The RACE Network Architecture," (posted at www.mc.com/techlit/#tech_brief prior to this), 6 pages.
R.Y. Wang, T.E. Anderson and D.A. Patterson, "Virtual Log Based File Systems For a Programmable Disk," Proc. Third Symposium on Operating Systems Design and Implementation, Feb. 1999 (Also appeared as University of California Technical Report CSD–98–1031, 16 pages.

(List continued on next page.)

*Primary Examiner*—Donald Sparks
*Assistant Examiner*—Christian P. Chace
(74) *Attorney, Agent, or Firm*—Robert C. Kowert; Meyertons, Hood, Kivlin, Kowert & Goetzel, P.C.

(57) ABSTRACT

A storage array interconnection fabric may be configured using a torus topology. A storage system including a path-redundant torus interconnection fabric is coupled to a plurality of nodes. The torus interconnection fabric may be configured to connect the plurality of nodes in an array including N rows and M columns, where N and M are positive integers. The array may be configured such that a first node in a first row of the N rows is connected to a second node in the first row and a first node in a first column of the M columns is connected to a second node in the first column. Also an ending node in the first row is connected to the first node in the first row and an ending node in the first column is connected to the first node in the first column. In addition, a first portion of the plurality of nodes is configured to communicate with a plurality of storage devices such as disk drives.

33 Claims, 8 Drawing Sheets

U.S. PATENT DOCUMENTS

| | | | |
|---|---|---|---|
| 5,613,069 A | | 3/1997 | Walker |
| 5,625,836 A | * | 4/1997 | Barker et al. ............... 709/214 |
| 5,671,356 A | * | 9/1997 | Wang ......................... 709/222 |
| 5,689,646 A | | 11/1997 | Thorson |
| 5,689,661 A | | 11/1997 | Hayashi et al. |
| 5,701,416 A | | 12/1997 | Thorson et al. |
| 5,720,025 A | | 2/1998 | Wilkes et al. |
| 5,729,756 A | * | 3/1998 | Hayashi ....................... 712/15 |
| 5,737,628 A | | 4/1998 | Birrittella et al. |
| 5,862,312 A | | 1/1999 | Mann et al. |
| 5,912,893 A | * | 6/1999 | Rolfe et al. ................. 370/406 |
| 5,970,232 A | | 10/1999 | Passint et al. |
| 6,016,510 A | | 1/2000 | Quattromani et al. |
| 6,023,753 A | | 2/2000 | Pechanek et al. |
| 6,055,618 A | | 4/2000 | Thorson |
| 6,101,181 A | | 8/2000 | Passint et al. |
| 6,167,502 A | | 12/2000 | Pechanek et al. |
| 6,338,129 B1 | * | 1/2002 | Pechanek et al. ............. 712/11 |
| 6,370,145 B1 | * | 4/2002 | Dally et al. ................. 370/400 |
| 6,405,185 B1 | * | 6/2002 | Pechanek et al. ............. 706/41 |

OTHER PUBLICATIONS

Prasant Mohapatra, Wormhole Routing Techniques for Directly Connected Multicomputer Systems, ACM Computing Surveys, vol. 30, No. 3, Sep. 1998, 37 pages.

Christopher Glass and Lionel Ni, "The Turn Model for Adaptive Routing," Journal of the Association for Computing Machinery, vol. 41, No. 5, Sep. 1994, pp. 874–902.

Reddy, Dept. of Computer & Information Sciences, "A Dynamically Reconfigurable WDM LAN Based on Reconfigurable Circulant Graph," IEEE, 1996, 4 pages.

Various Abstracts beginning with Funahashi, Jouraku and Amano, "Adaptive Routing for Recursive Diagonal Torus," Transactions of the Institute of Electronics, Information and Communication Engineers D–I, vol. J83D–I, No. 11, Nov. 2000, pp. 1143–1153.

Milan Kovacevic, Center for Telecommunications Research, "On Torus Topologies with Random Extra Links," IEEE 1996, pp. 410–418.

Dally, et al., The Torus Routing Chip, Distributed Computing, Springer–Verlag 1986, pp. 187–196.

Susan Hinrichs, "A Compile Time Model for Composing Parallel Programs," IEEE Parallel and Distributed Technology, 1995, 19 pages.

"CRAY T3D System Architecture Overview Manual," ftp://ftp.cray.com/product–info/mpp/T3D__Architecture__Over/T3D.overview.html, Cray Research, 1993, 40 pages.

Marco Fillo, et al., "The M–Machine Multicomputer," Laboratory for Computer Science, Massachusetts Institute of Technology, A.I. Memo No. 1532, Ann Arbor,. Mar. 1995, 14 pages.

Noakes, et al., "The J–Machine Multicomputer: An Architectural Evaluation," Proceedings of the 20$^{th}$ International Symposium on Computer Architecture, May 1993, 12 pages.

Dally, et al., "Architecture of a Message–Driven Processor," International Conference on Computer Architecture, Jun. 1987, pp. 189–196.

Dennison, Lee and Dally, "High–Performance Bidirectional Signalling in VLSI," Massachusetts Institute of Technology, Oct. 12, 1990, 20 pages.

Dally, et al., "Architecture and Implementation of the Reliable Router," Mass. Institute of Technology, Proceedings of Hot Interconnects II, Stanford CA, Aug. 1994, 12 pages.

Dally, et al., "The Reliable Router: A Reliable and High–Performance Communication Substrate for Parallel Computers," Proceedings of the First International Parallel Computer Routing and Communication Workshop, Seattle WA, May 1994, 15 pages.

Dennison, et al., "Low–Latency Plesiochronous Data Retiming," Mass. Institute of Technology, Proceedings of the 1995 Advanced Research in VLSI Conference, Chapel Hill NC, Mar. 1995, 12 pages.

Whay S. Lee, "Mechanism for Efficient, Protected Messaging," Massachusetts Institute of Technology, Dept. of Electrical Engineering and Computer Science, Jan. 20, 1999, 147 pages.

Dennison, "Reliable Interconnect Networks for Parallel Computers," Mass. Institute of Technology, Dept. of Electrical Engineering and Computer Science, Apr. 18, 1991, 79 pages.

Thucydides Xanthopoulos, "Fault Tolerant Adaptive Routing in Multicomputer Networks," Dept. of Electrical Engineering and Computer Science , Mass. Institute of Technology, Jan. 20, 1995, 152 pages.

Dennison, "The Reliable Router: An Architecture for Fault Tolerant Interconnect," Dept. of Electrical Engineering and Computer Science, Mass Institute of Technology, May 24, 1996, 145 pages.

"Introduction To Parallel Algorithms and Architectures: Arrays, Tress, Hypercubes," F. Thomson Leighton, Morgan Kaufmann Publishers, 1992, pp. 1–831.

Christopher J. Glass and Lionel Ni, "Fault–Tolerant Wormhole Routing in Meshes," Technical Report, MSU–CP-S–ACS–72, Oct. 30, 1992 (revised May 25, 1993), 28 pages.

Stefan Savage and John Wilkes, "AFRAID–A Frequently Redundant Array of Independent Disks," Proceedings of the 1996 USENIX Technical Conference, pp. 27–39, San Diego, CA, Jan. 1996, 13 pages.

Steve Ward, et al., "A Modular, Scalable Communications Substrate," MIT Laboratory for Computer Science, Jul. 1993, 10 pages.

Christopher Glass and Lionel Ni, "The Turn Model for Adaptive Routing," Technical Reports, MSU–CP-S–ACS–44, Oct. 10, 1991 (revised Mar. 2, 1992), pp. 278–287 (numbered herein as 1–20).

Thomas Stricker, "Message Routing on Irregular 2D–Meshes and Tori," School of Computer Science, Carnegie Mellon Univ., Jan. 15, 1991, pp. 170–177 (numbered herein as 1–19).

Dally, et al., "The J–Machine: A Restrospective," in 25 Years of the International Symposia on Computer Architecture—Selected Papers. pp. 54–58.

* cited by examiner

STORAGE ARRAY INTERCONNECTION FABRIC USING A TORUS TOPOLOGY

BACKGROUND OF THE INVENTION

1. Field of the Invention

This invention relates to data storage systems and, more particularly, to storage array interconnection topology.

2. Description of the Related Art

Computer systems are placing an ever-increasing demand on data storage systems. In many of the data storage systems in use today, data storage arrays are used. The interconnection solutions for many large storage arrays are based on bus architectures such as, for example, small computer system interconnect (SCSI) or fibre channel (FC). In these architectures, multiple storage devices such as disks, may share a single set of wires, or a loop in the case of FC, for data transfers.

Such architectures may be limited in terms of performance and fault tolerance. Since all the devices share a common set of wires, only one data transfer may take place at any given time, regardless of whether or not all the devices have data ready for transfer. Also, if a storage device fails, it may be possible for that device to render the remaining devices inaccessible by corrupting the bus. Additionally, in systems that use a single controller on each bus, a controller failure may leave all the devices on its bus inaccessible.

There are several existing solutions available, which are briefly described below. One solution is to divide the devices into multiple subsets utilizing multiple independent buses for added performance. Another solution suggests connecting dual buses and controllers to each device to provide path fail-over capability, as in a dual loop FC architecture. An additional solution may have multiple controllers connected to each bus, thus providing a controller fail-over mechanism.

In a large storage array, component failures may be expected to be fairly frequent. Because of the higher number of components in a system, the probability that a component will fail at any given time is higher, and accordingly, the mean time between failures (MTBF) for the system is lower. However, the above conventional solutions may not be adequate for such a system. To illustrate, in the first solution described above, the independent buses may ease the bandwidth constraint to some degree, but the devices on each bus may still be vulnerable to a single controller failure or a bus failure. In the second solution, a single malfunctioning device may still potentially render all of the buses connected to it, and possibly the rest of the system, inaccessible. This same failure mechanism may also affect the third solution, since the presence of two controllers does not prevent the case where a single device failure may force the bus to some random state.

SUMMARY

Various embodiments of a storage array using a torus interconnection topology are disclosed. In one embodiment, a storage system including a path-redundant torus interconnection fabric is coupled to a plurality of nodes. The torus interconnection fabric may be configured to connect the plurality of nodes in an array including N rows and M columns, where N and M are positive integers. The array may be configured such that a first node in a first row of the N rows is connected to a second node in the first row and a first node in a first column of the M columns is connected to a second node in the first column. Also an ending node in the first row is connected to the first node in the first row and an ending node in the first column is connected to the first node in the first column. In addition, a first portion of the plurality of nodes is configured to communicate with a plurality of storage devices such as disk drives. In other embodiments, the storage devices may be random access memories configured as cache memories or tape drives. A second portion of the plurality of nodes may be configured to communicate with a host.

In some embodiments, each node of the plurality of nodes may be configured to communicate with each other node of the plurality of nodes by routing messages bi-directionally. In an alterative embodiment, each node of the plurality of nodes is configured to communicate with each other node of the plurality of nodes by routing messages uni-directionally.

In an embodiment, a storage system including a path-redundant torus interconnection fabric is coupled to a plurality of nodes. The torus interconnection fabric is configured to logically connect the plurality of nodes in an array comprising a plurality of node rows and a plurality of node columns. The torus interconnection fabric is also configured to provide a communication path between each node in the array and at least four neighboring nodes. For each node at an end of one of the node rows or one of the node columns, the torus interconnection fabric is configured to provide a communication path to a node at the opposite end of the respective node row or node column. Each one of a first portion of the plurality of nodes comprises at least one mass storage device.

In an embodiment, a method of interconnecting a plurality of nodes in an array including N rows and M columns using a torus interconnection fabric, where N and M are positive integers, using a path-redundant torus interconnection fabric is recited. In one embodiment, a first node in a first row of the N rows is connected to a second node in the first row and a first node in a first column of the M columns is connected to a second node in the first column. Additionally, an ending node in the first row is connected to the first node in the first row and an ending node in the first column is connected to the first node in the first column. A first portion of the plurality of nodes is configured to communicate with a plurality of storage devices.

In an embodiment, a method for routing communications within a storage system comprising an array of nodes interconnected by a torus fabric is recited. In one embodiment, a communication from a source node is sent to a destination node using a first communication path. A failure in the first communication path may be detected, preventing the communication from reaching the destination node. The communication from the source node is resent to the destination node using a second communication path independent from the first communication path. The second communication path wraps either from an end of a node row of the array to the opposite end of the node row or from an end of a node column of the array to the opposite end of the node column.

Figure 1:
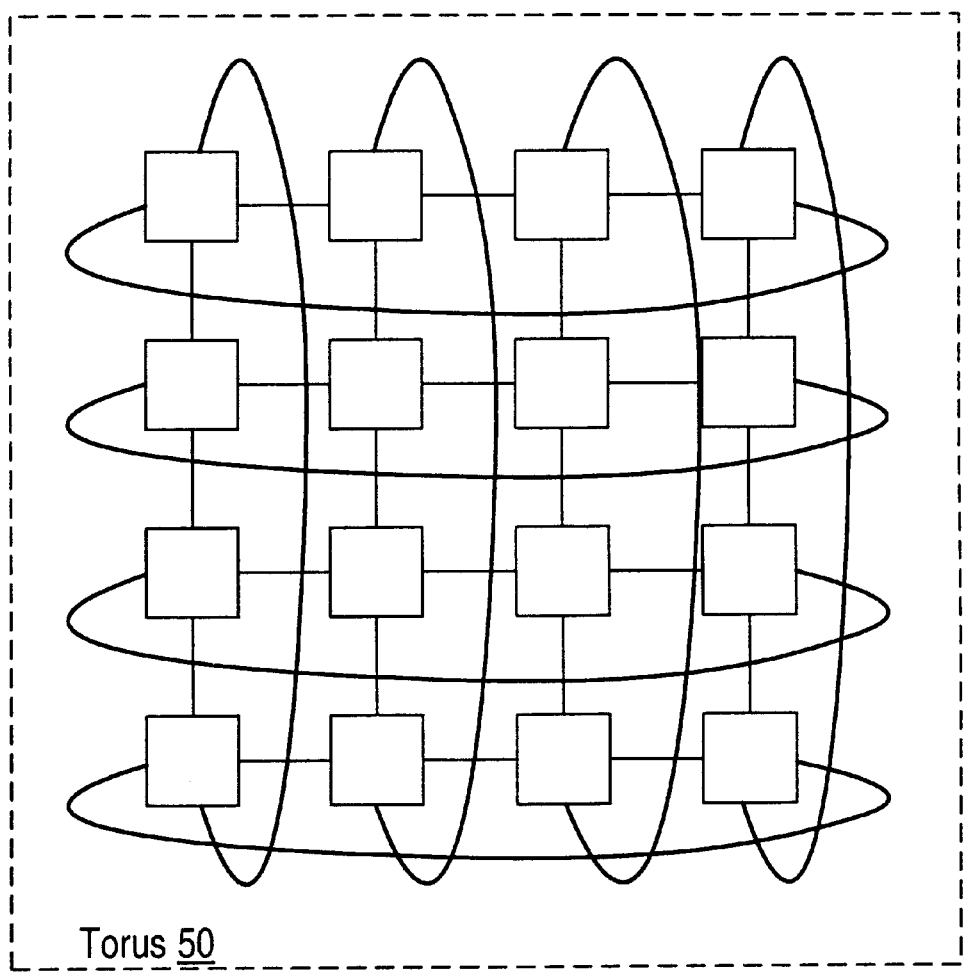
FIG. 1 is a diagram of one embodiment of a torus interconnection topology.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a diagram of one embodiment of a torus interconnection topology is shown. A torus topology 50 uses a two-dimensional (2-D) array topology. However, as FIG. 1 illustrates, the beginning nodes of each row and column are connected to the respective endpoints of each row and column. For example, if the 2-D array is an N by M array, where N and M are both positive integers, then the first node in row one would be connected to the last node in row one, in addition to all the other nodes neighboring the first node. Likewise, the top node in column 1 is connected to the bottom node in column 1 in addition to all the other nodes neighboring the top node. The remaining nodes are connected in similar fashion such that every node in the fabric of torus 50 is connected to its four neighboring four nodes. It is noted that torus 50 is shown as a flat two-dimensional array with longer connections between the endpoints. These may be logical connections and the physical layout of the nodes may be different. For example, each row may be physically oriented in the shape of a ring, such that the distance from the last node to the first node may be nearly the same as the distance between all the other nodes and likewise for the columns.

The level of interconnection described above means that each node has four ports with which to communicate to the other nodes. In one embodiment, each of the four ports is a bi-directional port, thus allowing both inputs and outputs from each neighbor. In an alternative embodiment, each of the four ports is a uni-directional port, thus allowing two inputs and two outputs. Thus, torus topology 50 may provide a richly path redundant interconnection fabric for a storage device system.

Although the above torus topology 50 is described using a two-dimensional array, it is contemplated that this same fabric may be extended to include a multi-dimensional array beyond two dimensions (not shown). One embodiment of a three dimensional array may include several two-dimensional arrays "stacked" or layered such that each node now has six neighboring nodes instead of four and each layer is connected together using the two additional ports.

Figure 2:
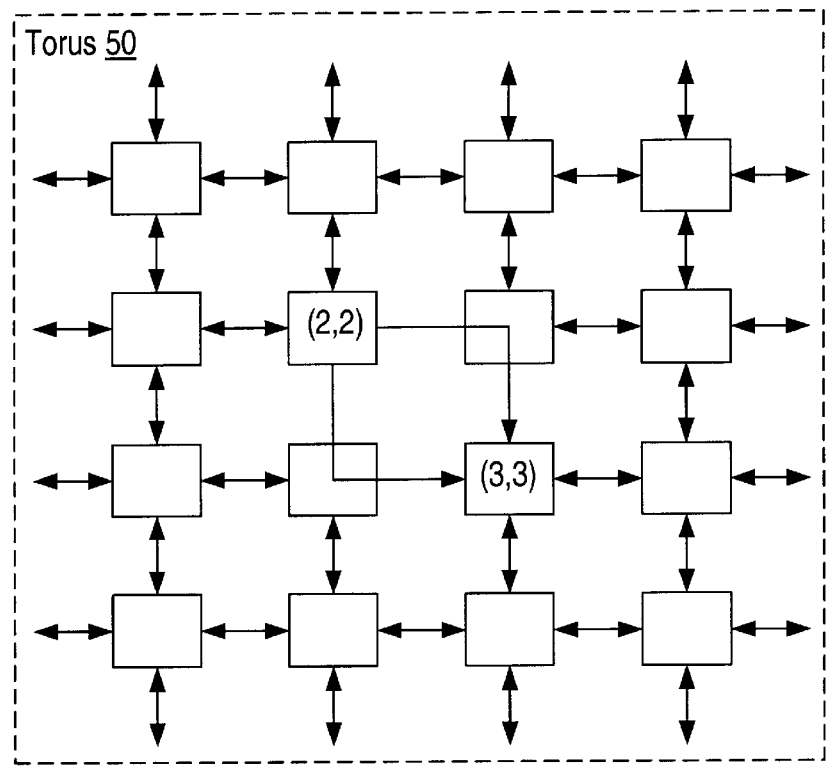
FIG. 2 is a diagram illustrating routing in a torus interconnection topology, according to one embodiment.
Figure 3:
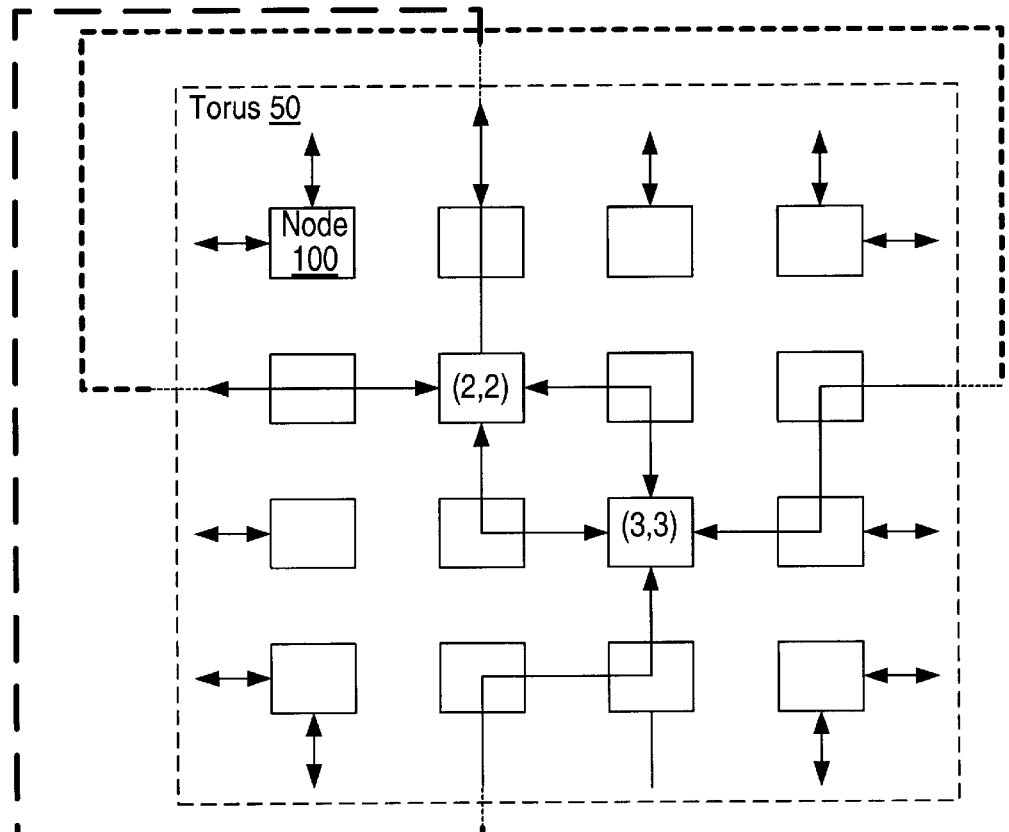
FIG. 3 is another diagram of routing in a torus interconnection topology, according to one embodiment.

Turning now to FIG. 2, a diagram of a first routing scheme using one embodiment of a torus interconnection topology is shown. The torus topology 50 of FIG. 1 is shown here with some of the interconnections not shown for clarity. In torus 50, one node is labeled 2,2 and one node is labeled 3,3. These locations are described in terms of their position in the N by M array described in FIG. 1, such that a location 2,2 describes a node located at the intersection of the second row and second column. For ease of describing this embodiment, the origin of torus 50 of FIG. 3 is located at the upper left corner and moving to the right means going in a positive M direction, and going down means going in a positive N direction. It is noted however, that in a torus interconnection fabric any point may be chosen as a zero reference point, since all points are interconnected.

In torus 50, each node may be capable of communicating with every other node in torus 50. Routing communications between nodes may be accomplished in one embodiment using a routing in which the coordinates of a sending node and a receiving node are specified. Then the route may be calculated by subtracting one from the other. For example, a node at location 2,2 is shown communicating with a node at location 3,3. Thus, (3,3)−(2,2)=(1,1); therefore, to get to 3,3 from 2,2 requires a single hope in the positive N direction followed by a single hop in the positive M direction. Alternatively, to get to 3,3 from 2,2 requires a single hop in the positive M direction followed by a single hop in the positive N direction. The actual path specification may be computed by the sender, or it may be deduced by the intermediate routing nodes through comparing the message destination address with their own. This routing scheme may result in "L" shaped paths. Even in such a simple scheme, there may always be at least two completely independent paths available between two nodes.

In another embodiment, manhattan-style routing may be employed in which routes may switch between X and Y dimensions more than once (e.g. zig-zag as opposed to L route). Such a routing scheme may provide more flexibility for circumventing faults in the fabric. The zig-zag route may be computed on-the-fly by the sender, for example, by randomly making a turn in the route, but always in a direction that brings the message closer to the destination.

Referring to FIG. 3, a diagram of a another routing scheme according to one embodiment for a torus interconnection topology is shown. The torus topology 50 of FIG. 1 is shown here with some of the interconnections not shown for clarity. In torus 50, one node is labeled 2,2 and one node is labeled 3,3. In one embodiment, there may be four completely independent paths that may be defined for each pair of nodes.

In FIG. 3, to get from node 2,2 to node 3,3 the two paths described in FIG. 2 are shown and, in addition, two more independent paths are described. From 2,2, a message may be routed to the left two nodes in a negative M direction to a node at the end of the same row. Then down one node in a positive N direction, then one node in the negative M direction. Alternatively, from 2,2 a message may be routed up two nodes in a negative N direction to the node at the end of the same column. Then right one node in a positive M direction followed by up one node in a negative N direction. In this routing scheme, the routes may switch from N to M direction and M to N direction more than one time. Typically, each change of direction is in a direction closer to the destination. These changes of direction may be calculated on the fly by any sending node. Thus far, the nodes have been described in a generic sense only to establish a few examples of the routing through torus 50. Four independent paths may be available to and from each node.

In one embodiment, the sender may maintain a small routing table for each of its destination nodes. Using such a table, four completely independent paths may always be defined between each pair of nodes. When such a static routing table is used, routes do not necessarily always turn in a direction that brings the message closer to the destination, because the route has been pre-defined to reach the destination.

If some routing paths are infrequently used, faults may develop over time on those paths and go undetected or bugs may lay dormant in the failover mechanism (e.g. failover software) for those paths and go undetected until it is too late and the path is needed. To help avoid such undetected conditions, all of the redundant paths may be exercised routinely. For example, in an embodiment using a routing table as described above, the sending node may simply cycle through the routing table for a particular destination when sending each subsequent message to that destination, thus choosing a different path in the table each time.

It is noted that the failures described above may refer to hardware and/or software faults. However, a failure may also be a simple inability to deliver a message to a destination node. There may be circumstances that produce a deadlock condition. In such circumstances, to alleviate a deadlock, a message may have to be discarded and the resent.

It is also contemplated that in some embodiments, more than four alternative routes may be designed in, where some of those paths may not be completely independent and may include portions of the four independent paths. In another embodiment, the four independent paths may be retried many times in a round robin scheme, in a persistently broken system, for example, prior to declaring a fault. More specifically, the available alternate paths may be retried in a pattern. The pattern may be repeated several times and then if a fault is still present, a failure may be declared.

Figure 4:
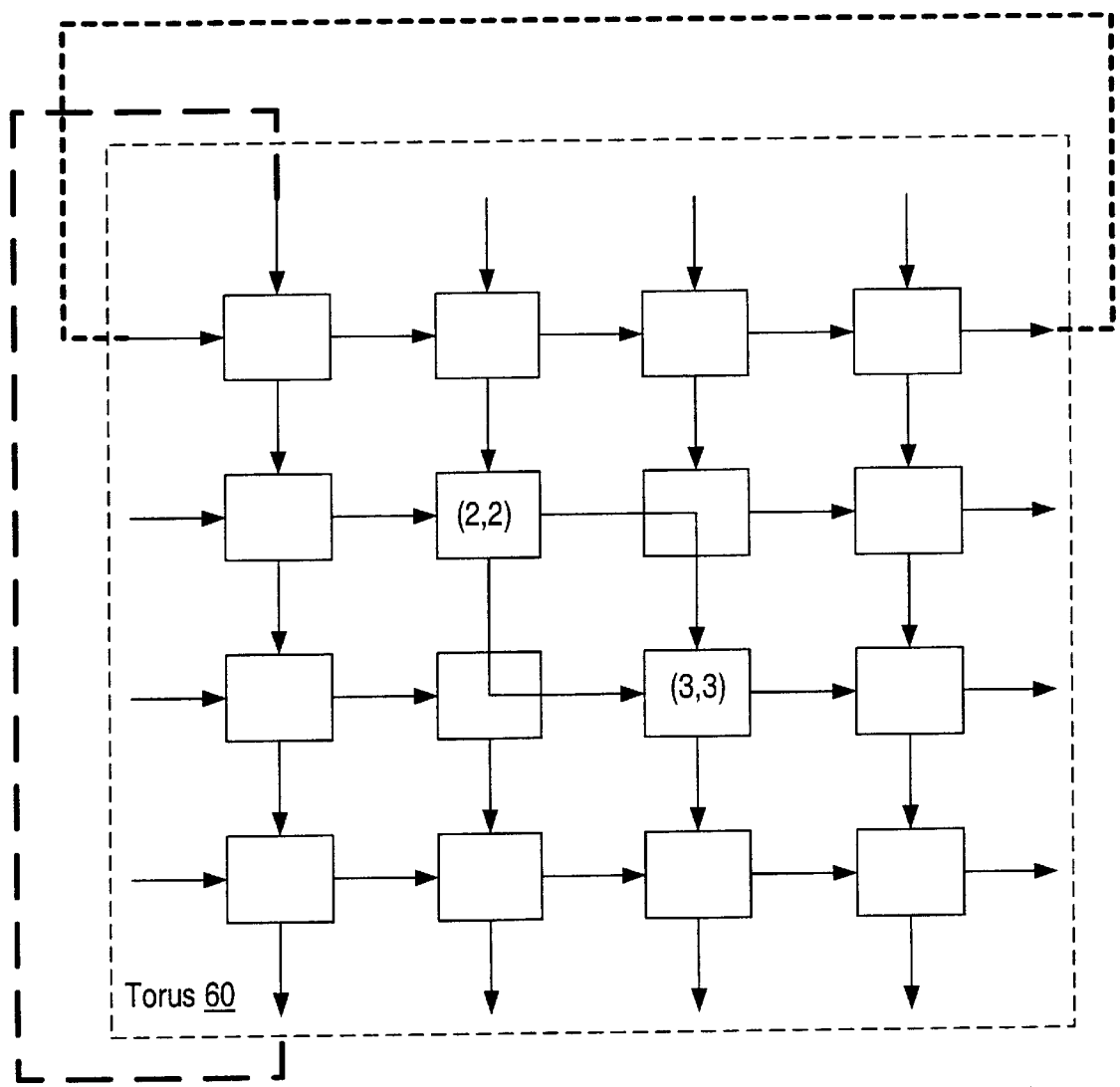
FIG. 4 is a diagram of one embodiment of a uni-directional torus interconnection topology.

Turning now to FIG. 4, a diagram of one embodiment of a uni-directional torus interconnection topology is shown. In this embodiment, a torus 60 of FIG. 4 is similar to torus 50 of FIG. 2 and FIG. 3 in the way the array is connected. However torus 60 of FIG. 4 is a uni-directional torus. This means that each node, although connected to four neighbors, has only two inputs and two outputs allowing two independent paths between each neighbor. Thus, uni-directional torus 60 may tolerate at least one failure between two nodes.

As will be described in more detail below, a torus interconnection fabric may be used to connect an array of storage devices.

Figure 5:
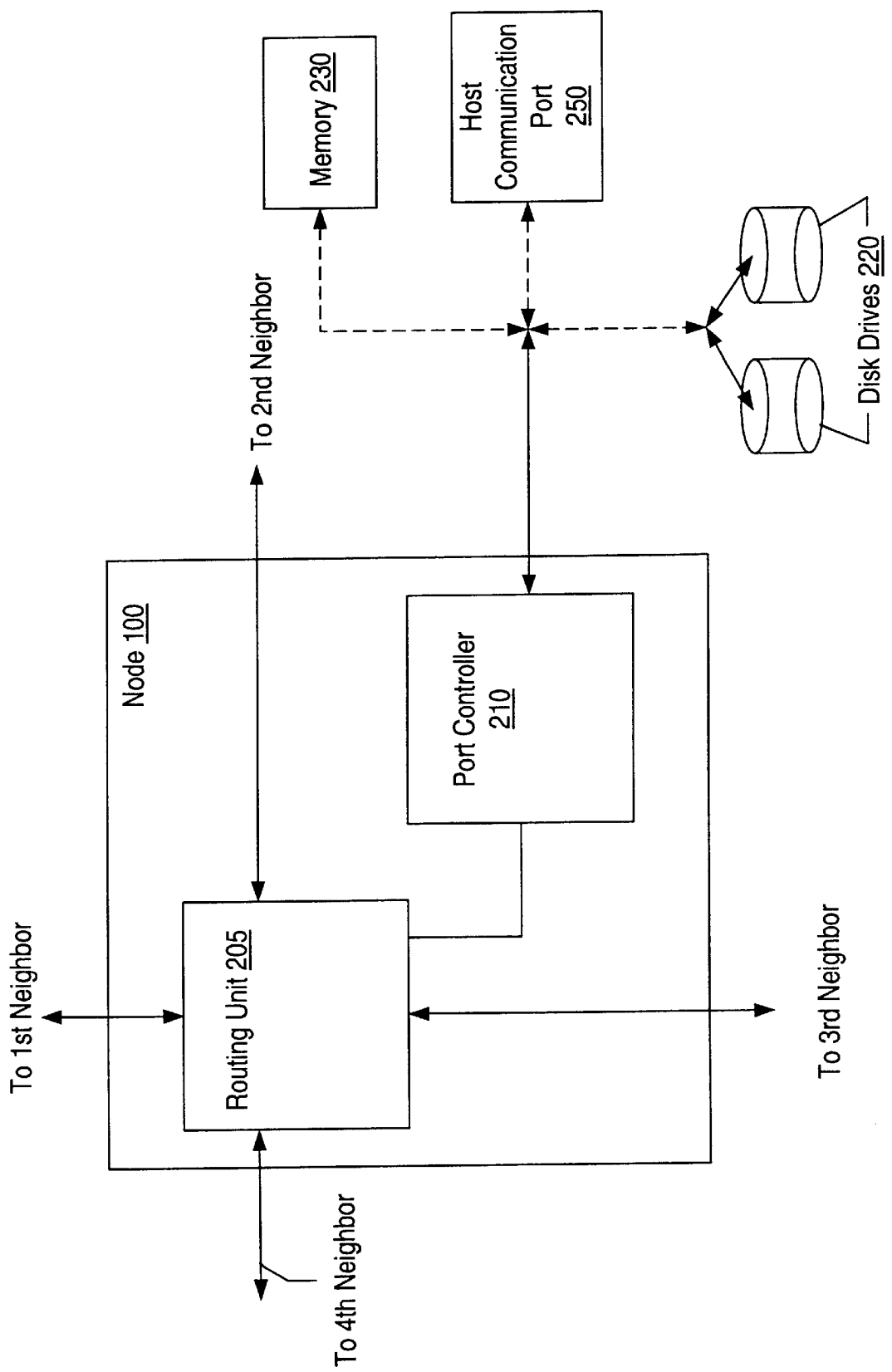
FIG. 5 is a block diagram of one embodiment of a node of a torus interconnection topology.

Turning now to FIG. 5 a block diagram of one embodiment of a node of a torus interconnection topology is shown. A node 100 includes a routing unit 205 coupled to a port controller 210. Routing unit 205 may be configured to communicate through four ports. In one embodiment, the ports may be bi-directional. Thus, routing unit 205 may communicate with four neighboring nodes allowing four independent routing paths. In an alternative embodiment, routing unit 205 may be configured with four uni-directional ports: two inputs and two outputs. The choice between using bi-directional and uni-directional ports may be influenced by competing factors. The unidirectional design may simpler, but it may only tolerate a single failure of a neighboring node. The bi-directional design tolerates more failures but may require a more complex routing unit 205. The size of the storage system array may be a determining factor, since for a very large number of storage devices, a three-fault tolerant bi-directional torus may become desirable to attain a reasonably low MTBF.

In one embodiment, port controller 210 may be configured to communicate with one or more disk drives 220. In another embodiment, port controller 210 may be configured to communicate with one or more random access memories 230, such as a cache memory or other type of memory and a memory controller. In yet another embodiment, port controller 210 may be configured to communicate with a host or Redundant Array of Inexpensive Disks (RAID) controller through a communication port such as, for example, a peripheral computer interface (PCI) bus or a System I/O port as defined by a specification available from the InfiniBand trade association. It is also contemplated that port controller 210 may have all of these functions or any combination of the above described functions. For example, port controller 210 may be configurable for selecting between any one of the different types of interfaces described above. Thus, the ability to communicate with and/or control storage devices and communicate to hosts in a torus interconnection fabric may advantageously increase the reliability, performance and flexibility of large storage systems.

It is further contemplated that port controller 210 may not have any devices attached. In such an embodiment, node 100 may simply connect to neighbors through routing port 205. Thus, node 100 may be used in the torus to increase the number of possible communication paths available. In a torus interconnect, some nodes may be unpopulated with storage or other devices, and used as a routing node to increase the number of paths in the torus.

Figure 6:
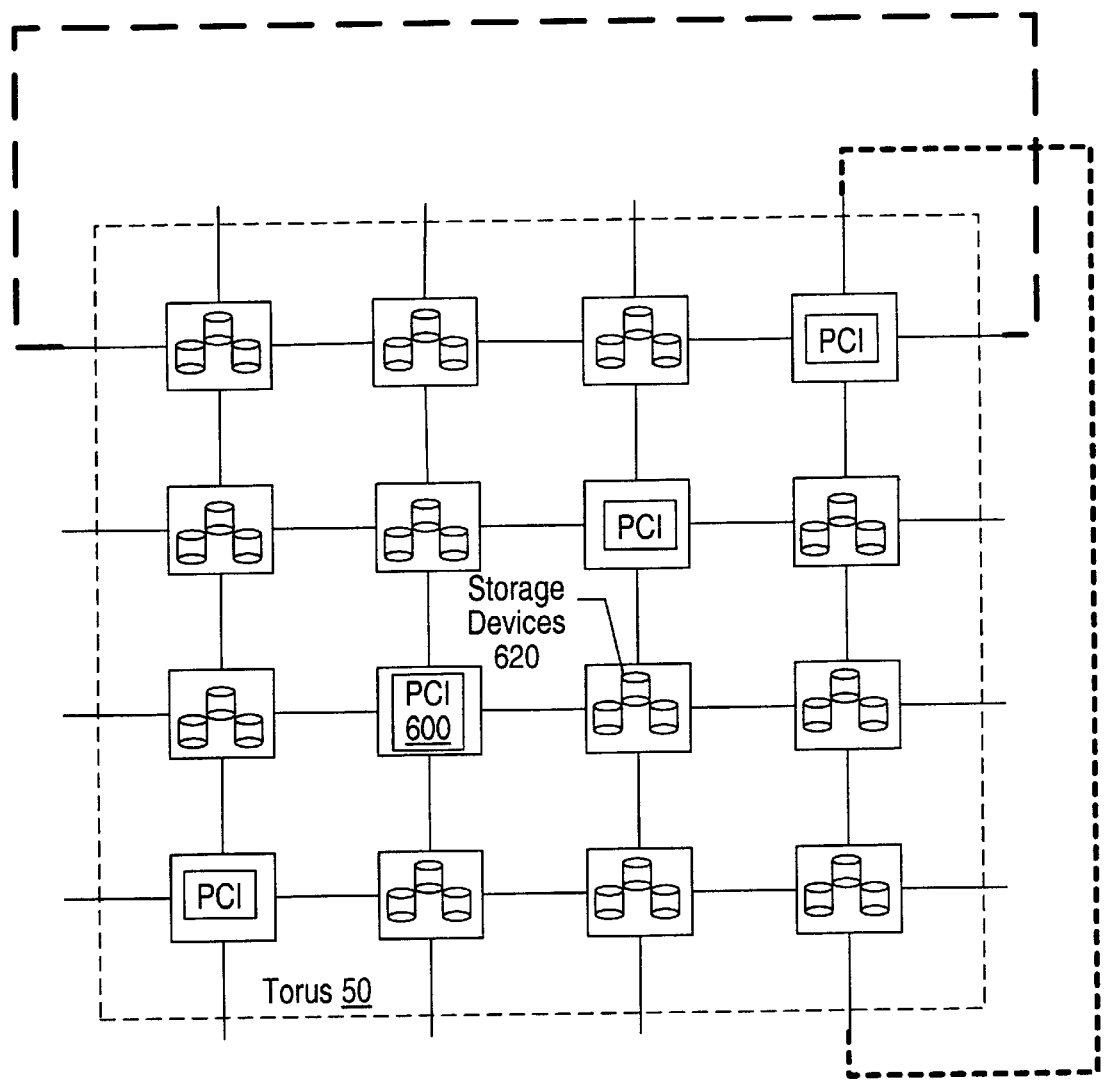
FIG. 6 is a diagram of one embodiment of a system configuration using a torus interconnection topology.

Referring to FIG. 6, a diagram of one embodiment of a node configuration of a torus interconnection topology is shown. The torus topology 50 of FIG. 1 is shown here with some of the interconnections not shown for clarity. In torus 50 of FIG. 6 a portion of the nodes are shown comprising storage devices, such as storage devices 620. In one embodiment storage devices 620 may be disk drives. Another portion of the nodes are shown with PCI blocks in them, such as PCI 600. PCI 600 is shown as an exemplary host communication port or line card. It is contemplated that other embodiments may use other host communication architectures such as System I/O. In this particular embodiment, the storage devices make up a large portion of torus 50. As mentioned above, many large storage systems use a large number of disks. To reduce costs, inexpensive and smaller disks may be used. However, since more disks may increase the failure rate, a highly redundant interconnection fabric, such as torus 50 may be used to provide a reliable overall system.

Additionally, the multiple paths of the torus interconnect allow for multiple parallel communications and/or disk operations that may be initiated over different paths, thereby possibly increasing the bandwidth and performance of the storage system. In a torus storage system with multiple controllers/host attachments, many parallel paths may exist between the hosts and the disks. Thus, many disk operations may be issued at the same time, and many data transfers may take place concurrently over the independent paths. This concurrency may provide a performance advantage and more scalability over bus-based architectures in which multiple devices must take turns using the same wires/fibre.

It is noted that other embodiments may use fewer or more storage devices 620 and fewer or more PCI 600 nodes to facilitate cost and performance tradeoffs. In addition, and as mentioned above, it is contemplated that some nodes may be configured to communicate with RAID controllers, and/or cache memory controllers. Thus, depending on the MTBF of the storage devices, a storage system may be designed using torus 50 that has a relatively low cost and high reliability and performance as compared to storage systems using fewer more expensive disks.

Figure 7A:
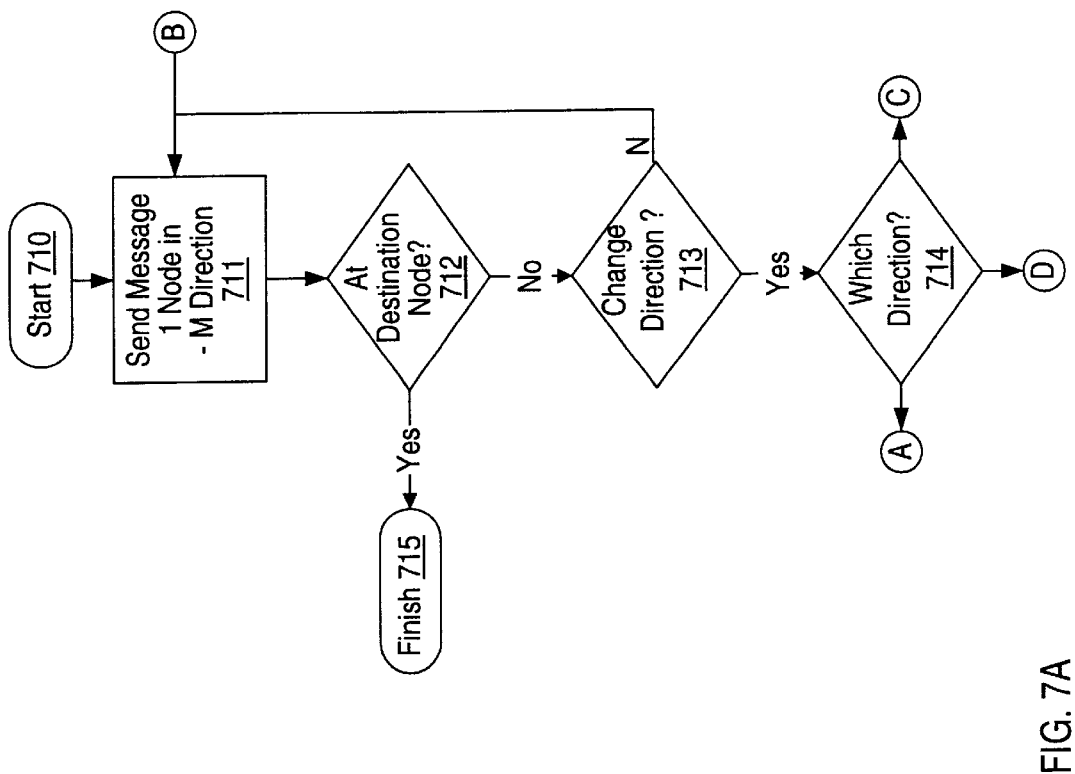
FIG. 7A and FIG. 7B illustrate a flow diagram of one routing scheme in a bi-directional torus interconnection topology, according to one embodiment.
Figure 7A:
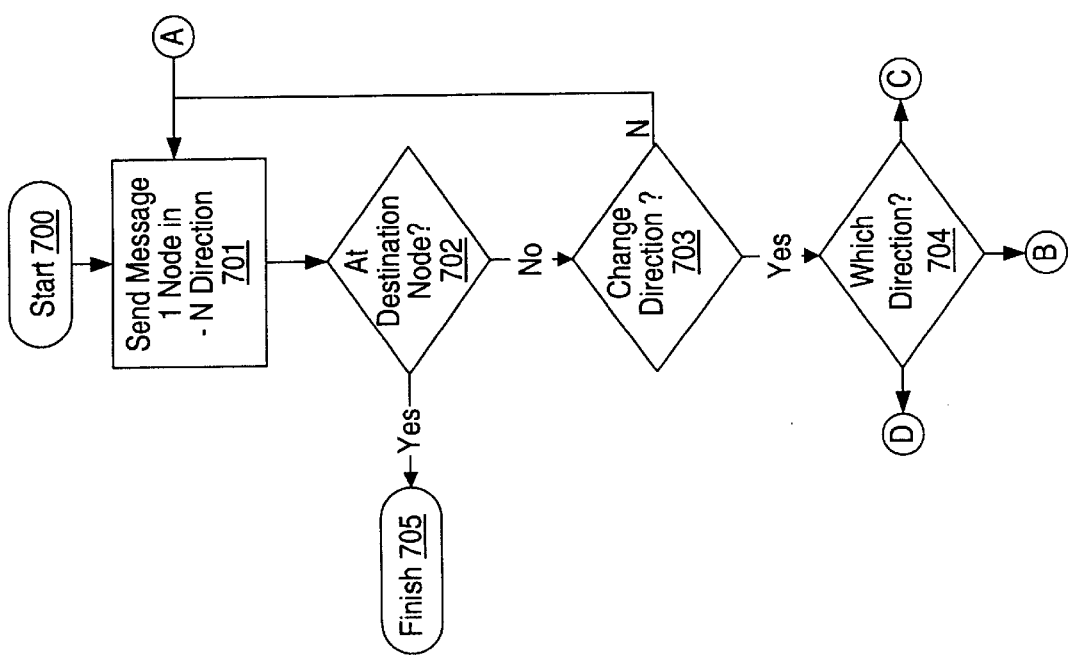
Figure 7B:
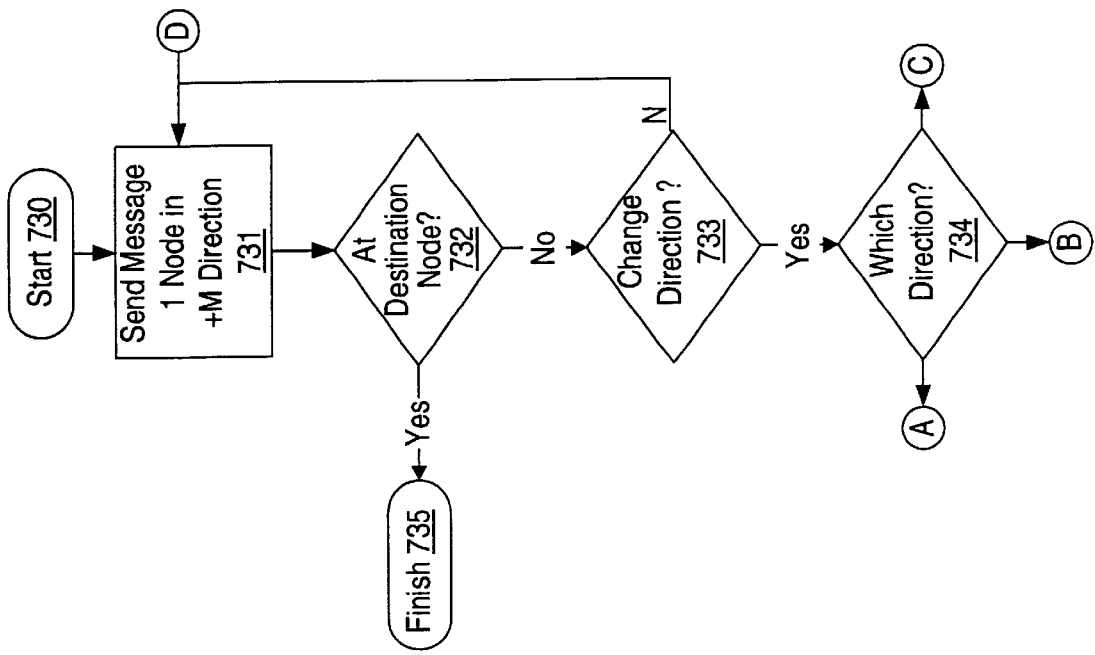
Figure 7B:
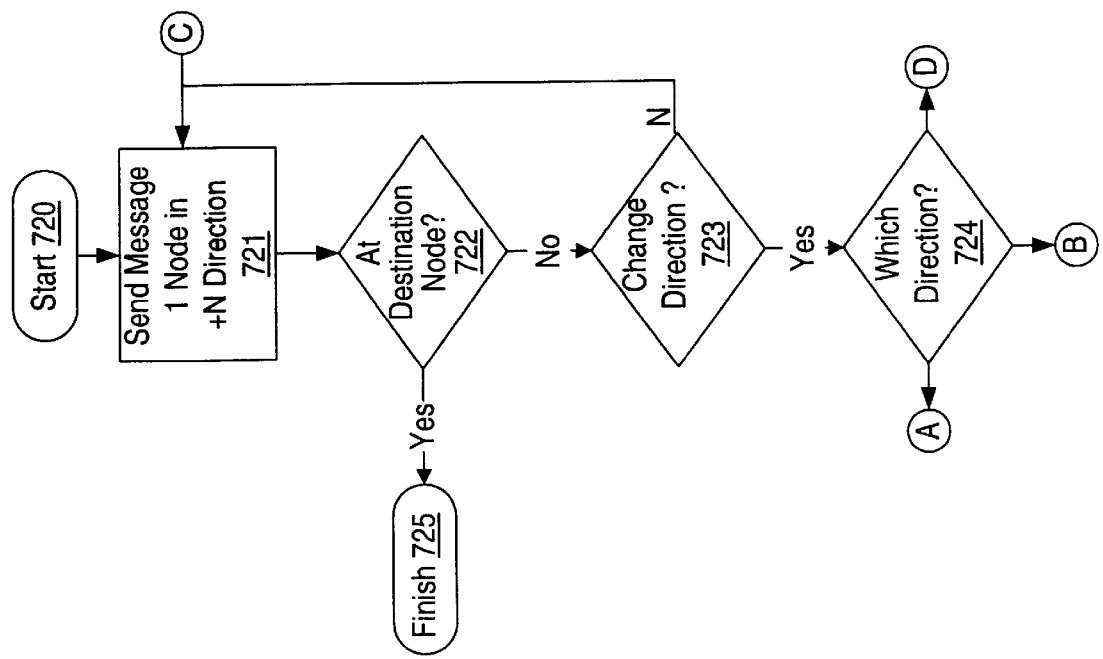

Collectively, FIG. 7A and FIG. 7B illustrate a flow diagram of one routing scheme of one embodiment of a bi-directional torus interconnection topology. A message is sent from a source node at location 2,2 to a destination node at 3,3 as shown in FIG. 3. It is noted that depending on which direction the message is sent from the source node, determines where in the flow diagram of FIG. 7A and FIG. 7B the process begins. Turning now to FIG. 7A and beginning at step 700, a message is sent. Proceeding to step 701, the message is sent on the path in the negative N direction. At each node, a new path may be calculated on-the-fly by the sending node, thereby allowing flexibility in circumventing path faults. Operation proceeds to step 702 checking if the message is at the destination node. If the message were at the destination node, then processing would finish at step 705. In this example, this node is not the destination node and so processing continues to step 703. The node may decide to change direction randomly, or it may detect a fault on one or more neighboring nodes. If the node changes the direction of the message, processing would proceed to step 704 and a direction would be chosen. Processing would then continue to one of step 711, 721 or 731. In this example the direction does not change and so processing continues back to step 701. This is the basic process flow and it is repeated for each direction that a message may be sent.

The message is sent to the next node in the negative N direction. Proceeding to step 702, again the node is checked to see if it is the destination node. If it were the destination node, processing would finish at step 705. In this example, it is not the destination node and so processing continues to step 703. This time, a change of direction is chosen and processing proceeds to step 704. In FIG. 3 the direction chosen is the positive M direction, so in FIG. 7A processing continues to 'D', which is step 731 of FIG. 7B, where the message is sent to the next node in the positive M direction. Proceed to step 732 and check if it is the destination node. If it were the destination node, processing would finish at step 735. In this example, it is not the destination node and so processing continues to step 733. Again a change of direction is indicated. Proceeding to step 734, a direction is chosen and according to FIG. 3, the message is sent in the negative N direction, so FIG. 7B, processing continues to 'A', which is step 701 of FIG. 7A. The message is sent one node in the negative N direction. Proceeding to step 702 and checking for the destination node. In this example, this node is the destination node and so processing finishes at step 705.

A similar example is shown in FIG. 3, where the message is sent from the node at location 2,2 but starting in the negative M direction. In that instance, processing would begin at step 710 of FIG. 7A and continue in a similar manner as described in the above example.

It is noted that while the above descriptions describe messages being sent and received, it is also contemplated that other embodiments of a torus topology and associated nodes may also be capable of communicating in the context of circuit switching. In such embodiments, instead of passing messages from one node to another, the sender may open a channel or connection through one or more nodes to the destination. This channel may be thought of as a virtual circuit, whereby the sender may dynamically connect itself to a receiver. Thus, the two nodes may then communicate directly as if they had a physical wire between them. This virtual circuit may be dynamically dismantled logically at the end of the communication between the sender/receiver pair. Thus, other sender/receiver pairs may use the same physical paths to construct their own virtual circuit for a communication.

Figure 8:
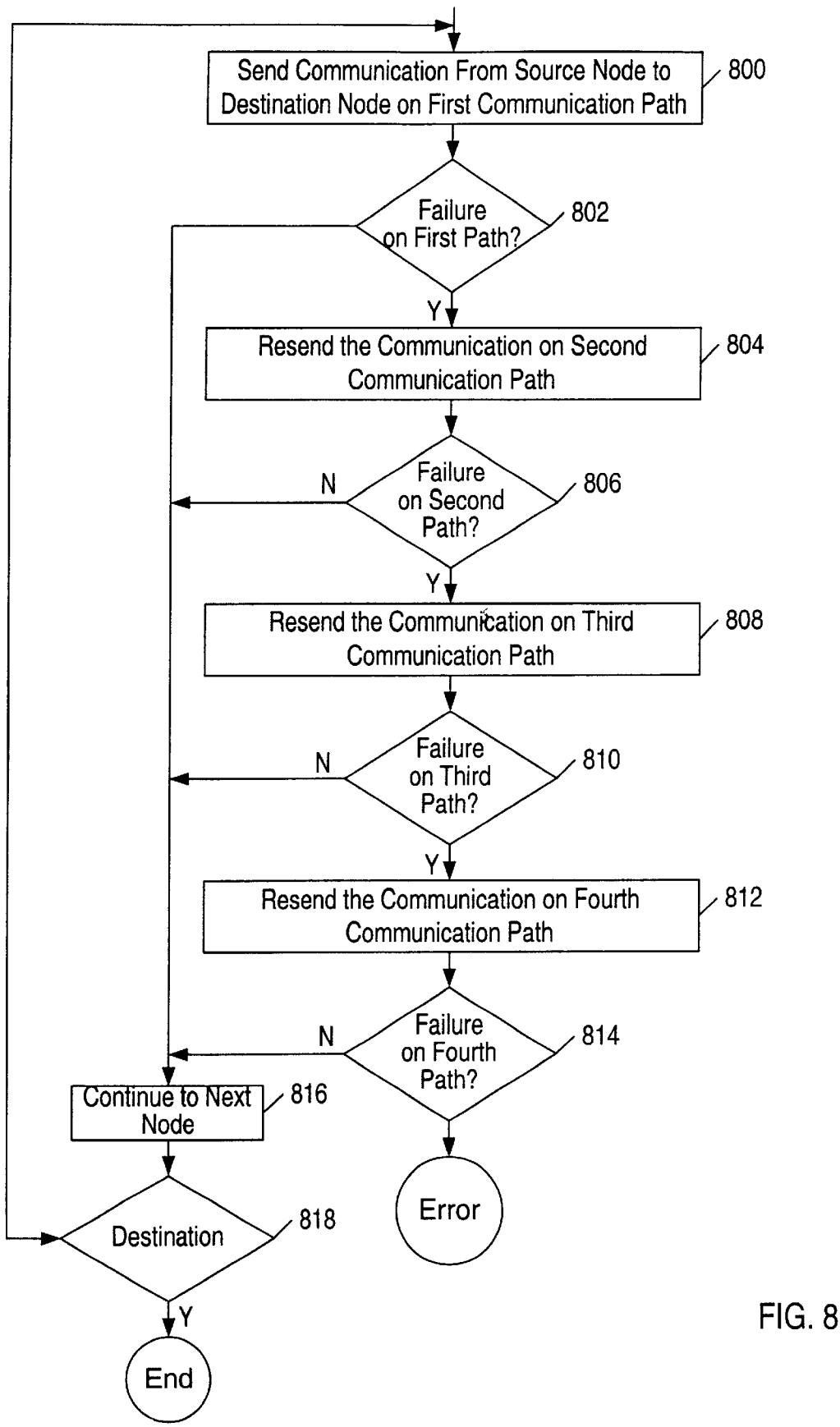
FIG. 8 is a flow diagram of a method for routing communications within a torus interconnect fabric.

Turning now to FIG. 8, a method is illustrated for routing communications within torus interconnect fabric between nodes in which failures may be detected. A communication may be sent from a source node to a destination node on a first communication path as indicated at 800. A failure may or may not be detected on the first communication path from the source node as indicated at 802. If no failure is detected the communication continues on to the next node as indicated at 816. If a failure is detected the communication may be resent on a second communication path as indicated at 804. Since the torus interconnect fabric provides at least four independent communication paths from each node, in one embodiment, this procedure may be repeated in case the second communication path and a third communication path fails as indicated at 806 through 814. If a fourth communication path fails then an error may be declared. Assuming that at least one path from the source node was working the communication continues to the next node as indicated at 816. If the next node is a destination node then the routing process is complete as indicated at 818, otherwise the routing procedure may be repeated for the next node.

Numerous variations and modifications will become apparent to those skilled in the art once the above disclosure is fully appreciated. It is intended that the following claims be interpreted to embrace all such variations and modifications.

What is claimed is:

1. A storage system, comprising:

a plurality of nodes, wherein different ones of said plurality of nodes perform different functions in the storage system; and path-redundant torus interconnection fabric coupled to said plurality of nodes;

wherein said torus interconnection fabric is configured to connect said plurality of nodes in an array including N rows and M columns, wherein N and M are positive integers;

wherein first node in a first row of said N rows is connected to a second node in said first row and a first node in a first column of said M columns is connected to a second node in said first column;

wherein an ending node in said first row is connected to said first node in said first row and an ending node in said first column is connected to said first node in said first column;

wherein a first portion of said plurality of nodes are storage nodes each comprising one or more mass storage services; and wherein a second portion of said plurality of nodes are one or more host interface nodes each configured to provide an interface for the storage system to a host computer.

2. The storage system as recited in claim 1, wherein each node of said plurality of nodes is configured to communicate with each other node of said plurality of nodes by routing messages bi-directionally.

3. The storage system as recited in claim 1, wherein said mass storage devices are disk drives.

4. The storage system as recited in claim 1, wherein a third portion of said plurality of nodes comprise random access memories configured as storage cache.

5. The storage system as recited in claim 1, wherein said mass storage devices are tape drives.

6. The storage system as recited in claim 1, wherein each node of said plurality of nodes is configured to communicate with each other node of said plurality of nodes by routing messages uni-directionally.

7. The storage system as recited in claim 1, wherein a second portion of said plurality of nodes is configured to communicate with a host.

8. A method of interconnecting a plurality of nodes in an array including N rows and M columns using a torus interconnection fabric, wherein N and M are positive integers, using a path-redundant torus interconnection fabric, said method comprising:

connecting a first node in a first row of said N rows to a second node in said first row;

connecting a first node in a first column of said M columns to a second node in said first column;

connecting an ending node in said first row to said first node in said first row; and connecting an ending node in said first column to said first node in said first column;

where in different ones of said plurality of nodes perform different functions, wherein a first portion of said plurality of nodes are storage nodes each comprising one or more mass storage devices, and wherein a second portion of said plurality of nodes are one or more host interface nodes each configured to provide and interface for the storage system to a host computer.

9. The method as recited in claim 8 further comprising each node of said plurality of nodes communicating with each other node of said plurality of nodes by routing messages bi-directionally.

10. The method as recited in claim 8, wherein said mass storage devices are disk drives.

11. The method as recited in claim 8, wherein said mass storage devices are tape drives.

12. The method as recited in claim 8, wherein a third portion of said plurality of nodes comprise random access memories configured as cache memories.

13. The method as recited in claim 8 further comprising a second portion of said plurality of nodes communicating with a host.

14. The method as recited in claim 8 further comprising each node of said plurality of nodes communicating with each other node of said plurality of nodes by routing messages uni-directionally.

15. A storage system, comprising:

a plurality of nodes, wherein different ones of said plurality of nodes perform different functions in the storage system; and path-redundant torus interconnection fabric coupled to said plurality of nodes;

wherein said torus interconnection fabric is configured to logically connect said plurality of nodes in an array comprising a plurality of node rows and a plurality of node column;

wherein said torus interconnection fabric is configured to provide a communication path between each node in the array and at least four neighboring nodes;

wherein, each node at end of one of said node rows or one of said node columns, said torus interconnection fabric is configured to provide a communication path to a node at the opposite end of the respective node row or node column;

wherein each one of a first portion of said plurality of nodes is a storage node comprising at least one mass storage device; and wherein each one of a second portion of said plurality of nodes is a host interface node configured to provide and interface for the storage system to a host computer.

16. The storage system as recited in claim 15, wherein said communication paths provided by said torus interconnection fabric between each node are bi-directional paths such that each node in the array may be accessed on at least four independent communication paths.

17. The storage system as recited in claim 15, wherein the communication paths provided by said torus interconnection fabric between each node are uni-directional paths such that communications may be sent to each node in the array on at least two independent uni-directional communication paths and communications may be received by each node on at least two independent uni-directional communication paths.

18. The storage system as recited in claim 15, wherein said mass storage devices comprise disk drives.

19. The storage system as recited in claim 15, wherein said mass storage devices comprise optical storage devices.

20. The storage system as recited in claim 15, wherein each one of a second portion of said plurality of nodes comprises random access memory configured as a storage cache.

21. The storage system as recited in claim 15, wherein each one of a second portion of said plurality of nodes comprises a communication interface to a host.

22. A method for routing communications within a storage system comprising an array of nodes interconnected by a torus fabric, the method comprising:

sending a communication from a source node to a destination node using a first communication path, wherein said source node is a host node configured to provide and interface for the storage system to a host computer, and wherein said destination node is a storage node comprising one or more mass storage devices;

detecting a failure in said first communication path; and resending said communication from said source node to said destination node using a second communication path independent from said first communication path;

wherein said second communication path wraps either from an end of a node row of the array to the opposite end of said node row or from an end of a node column of the array to the opposite end of said node column.

23. The method as recited in claim 22, further comprising:

detecting a failure in said second communication path; and resending said communication from said source node to said destination node using a third communication path independent from said first and said second communication paths.

24. The method as recited in claim 23, further comprising:

detecting a failure in said third communication path; and resending said communication from said source node to said destination node using a fourth communication path independent from said first, said second and said third communication paths.

25. The method as recited in claim 24, wherein said source node is located at a logical edge of the array.

26. The method as recited in claim 25, wherein said destination node is located at a logical edge of the array.

27. A storage system, comprising:

a plurality of nodes, wherein different ones of said plurality of nodes perform different functions in the storage system, configured as:

a plurality of node rows; and a plurality of node columns;

wherein each node in said plurality of nodes is a member of one of said node rows and one of said node columns; and a torus interconnect fabric configured to provide a communication path between said nodes in said node rows and said node columns;

wherein said torus interconnect fabric is configured to logically connect each node row as a ring of row nodes and each row column as ring of column nodes, such that each node of said plurality of nodes is connected to every other node of said plurality of nodes by at least four independent communication paths;

wherein each one of a first portion of said plurality of nodes is a storage node comprising at least one mass storage device; and wherein each one of a second portion of said plurality of nodes is a host interface node configured to provide and interface for the storage system to a host computer.

28. The storage system as recited in claim 27, wherein said communication paths connecting each node of said plurality of nodes to every other node of said plurality of nodes are bi-directional paths such that each node in the plurality of nodes may be accessed on at least four independent communication paths.

29. The storage system as recited in claim 27, wherein said communication paths connecting each node of said plurality of nodes to every other node of said plurality of nodes are uni-directional paths such that communications may be sent to each node in the plurality of nodes on at least two independent uni-directional communication paths and communications may be received by each node on at least two independent uni-directional communication paths.

30. The storage system as recited in claim 27, wherein said mass storage device comprises a disk drive.

31. The storage system as recited in claim 27, wherein said mass storage device comprises an optical storage device.

32. The storage system as recited in claim 27, wherein each one of a second portion of said plurality of nodes comprises random access memory configured as a storage cache.

33. The storage system as recited in claim 27, wherein each one of a second portion of said plurality of nodes comprises a communication interface to a host.

* * * * *

UNITED STATES PATENT AND TRADEMARK OFFICE
CERTIFICATE OF CORRECTION

PATENT NO. : 6,718,428 B2
DATED : April 6, 2004
INVENTOR(S) : Lee et al.

It is certified that error appears in the above-identified patent and that said Letters Patent is hereby corrected as shown below:

Column 9,
Line 52, after "wherein,", please insert -- for --.
Line 52, between "at" and "end", please insert -- an --.
Line 61, after "configured to provide" please delete "and" and insert -- an -- in place thereof.

Column 10,
Line 26, before "interface for", please delete "an" and insert -- and -- in place thereof.

Column 11,
Line 11, after "to provide", please delete "an" and insert -- and -- in place thereof.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,718,428 B2
DATED : April 6, 2004
INVENTOR(S) : Lee et al.

It is certified that error appears in the above-identified patent and that said Letters Patent is hereby corrected as shown below:

Column 9,
Line 52, after "wherein,", please insert -- for --.
Line 52, between "at" and "end", please insert -- an --.
Line 61, after "configured to provide" please delete "and" and insert -- an -- in place thereof.

Column 10,
Line 26, before "interface for", please delete "and" and insert -- an -- in place thereof.

Column 11,
Line 11, after "to provide", please delete "and" and insert -- an -- in place thereof.

This certificate supersedes Certificate of Correction issued August 17, 2004.

Signed and Sealed this

Ninth Day of November, 2004

JON W. DUDAS
*Director of the United States Patent and Trademark Office*